UNITED STATES PATENT OFFICE.

JOHN T. DWYER, OF ST. LOUIS, MISSOURI.

SOFT SOLDER.

1,059,982.    Specification of Letters Patent.    Patented Apr. 29, 1913.

No Drawing.    Application filed January 2, 1913.    Serial No. 739,896.

*To all whom it may concern:*

Be it known that I, JOHN T. DWYER, a citizen of the United States, residing at St. Louis, Missouri, have invented a certain new and useful Improvement in Soft Solder, of which the following is a full, clear, and exact description, such as will enable others skilled in the art to which it appertains to make and use the same.

This invention relates to soft solder, namely, solder such as is universally used by tinners and plumbers for uniting sheet tin, sheet copper or lead.

The main object of my invention is to provide a soft solder that is just as efficient as the soft solder now in general use but which can be manufactured at a much lower cost.

Another object is to provide a soft solder that will flow more freely than the soft solder now in general use, thereby enabling a workman to do more work with it in the same period of time than is possible with soft solder of the kind now universally used. And still another object is to provide a novel process of making my improved solder.

The soft solder now in general use is composed of lead and tin or lead, tin and antimony. I have discovered that an efficient solder can be produced by using a less quantity of tin and combining phosphorus with the other ingredients of the solder. By forming solder in this manner I effect a saving of from 7 to 15% in the quantity of tin used and I am thus able to materially reduce the cost of manufacturing soft solder. In fact, my improved solder costs from five to seven cents per pound less to manufacture than the soft solder now in general use which is composed entirely of tin and lead or tin, lead and antimony. My improved solder is not only less expensive than the soft solder now universally used, but it is more efficient in that it flows more freely and does not oxidize as easily as solder that contains from 7 to 15% more tin. The specific proportions of the ingredients are immaterial within certain limits so far as my invention is concerned as an efficient, practicable and marketable solder can be made by combining from 50 to 75% of lead with 25 to 50% of tin and adding from .01 to .05% phosphorus with said ingredients. A small quantity of antimony, say, for example, up to 2%, is preferably combined with the other ingredients above-mentioned.

In manufacturing my improved solder for general commercial purposes I have been able to save from four to five cents per pound on solder composed of the following ingredients mixed in approximately the proportions specified: 41½% of tin, .02% of phosphorus, 2% of antimony, and the balance of lead. In addition to effecting a great saving in the cost of manufacturing, the phosphorus fluxes and causes the metal to flow freely, it improves the appearance of the solder by making it smooth, and it prevents oxidation, thereby saving a large amount of dross.

The process that I prefer to use in manufacturing my improved solder consists in first melting the required amount of lead in a suitable receptacle, then adding the required quantity of tin and antimony to the molten lead and stirring or agitating said mass by any suitable means so as to thoroughly mix the lead and tin together. Thereafter the phosphorus is introduced, it being preferable to introduce the phosphorus with an ordinary phosphorizer such, for example, as is used in phosphorizing copper. After the phosphorus is thoroughly melted the phosphorizer is removed and the molted mass is thoroughly stirred or agitated before the mixture is poured into the molds. Ordinary yellow phosphorus may be used in making my improved solder, or a substance known as "phosphor-tin" may be used.

While I have found that the proportions herein specifically mentioned produce a solder that is thoroughly practicable for general commercial use, it will, of course, be understood that the proportions of tin and lead could be varied somewhat without departing from the spirit of my invention.

Having thus described my invention, what I claim as new and desire to secure by Letters Patent is:

1. A soft solder composed of lead, tin, antimony and from .01 to .05% of phosphorus.

2. A soft solder composed of lead, tin, antimony and phosphorus.

3. A soft solder consisting of from 50 to

75% lead, 25 to 50% tin, .05 to 2% antimony, and from .01 to .05% phosphorus.

4. A soft solder composed of the following ingredients mixed in approximately the proportions specified: 41½% tin, 2% antimony, .02% phosphorus, and 56½% lead.

In testimony whereof I hereunto affix my signature in the presence of two witnesses, this thirtieth day of December 1912.

JOHN T. DWYER.

Witnesses:
  WELLS L. CHURCH,
  GEORGE BAKEWELL.